United States Patent
Ohlig et al.

(10) Patent No.: US 12,420,763 B2
(45) Date of Patent: Sep. 23, 2025

(54) METHOD AND TECHNOLOGY FOR DETECTING AND RELEASING ICED-UP BRAKE LININGS OF AN ELECTRIC PARKING BRAKE

(71) Applicant: ZF Active Safety GmbH, Koblenz (DE)

(72) Inventors: Benedikt Ohlig, Vallendar (DE); Thomas Hein, Neuwied (DE); Michael Bergmann, Koblenz (DE)

(73) Assignee: ZF Active Safety GmbH, Kobienz (DE)

( * ) Notice: Subject to any disclaimer, the term of this patent is extended or adjusted under 35 U.S.C. 154(b) by 248 days.

(21) Appl. No.: 17/853,995

(22) Filed: Jun. 30, 2022

(65) Prior Publication Data
US 2023/0001907 A1   Jan. 5, 2023

(30) Foreign Application Priority Data
Jul. 5, 2021 (DE) .......................... 102021117276.4

(51) Int. Cl.
*B60T 13/74* (2006.01)
*B60T 17/22* (2006.01)

(52) U.S. Cl.
CPC .......... *B60T 13/741* (2013.01); *B60T 17/221* (2013.01); *B60T 2201/124* (2013.01)

(58) Field of Classification Search
CPC ........ B60T 8/17; B60T 8/17551; B60T 8/176; B60T 8/1761; B60T 8/26; B60T 8/32;
(Continued)

(56) References Cited

U.S. PATENT DOCUMENTS

| | | | |
|---|---|---|---|
| 2021/0078557 A1* | 3/2021 | Kobune | B60T 13/741 |
| 2021/0261108 A1* | 8/2021 | Igari | B60T 8/885 |
| 2021/0269001 A1* | 9/2021 | Suzuki | B60T 8/329 |

FOREIGN PATENT DOCUMENTS

| | | |
|---|---|---|
| DE | 10127480 A1 | 3/2002 |
| DE | 102011103660 A1 | 12/2012 |

(Continued)

OTHER PUBLICATIONS

English translation of DE 102019004963 (Year: 2019).*
English translation of EP 1407951 (Year: 2004).*
English translation of KR 20220001551 (Year: 2022).*

*Primary Examiner* — Peter D Nolan
*Assistant Examiner* — Brandon Z Willis
(74) *Attorney, Agent, or Firm* — Kristin L. Murphy

(57) ABSTRACT

A method for determining a state of a brake lining on a wheel brake of a brake system of a motor vehicle is disclosed. The wheel brake has an electromechanical brake actuator which is designed to build up a force, such as a braking force, acting on a brake disc of the brake system by pressing the brake lining against the brake disc, and which is assigned to a first axle of the motor vehicle. The method comprises the steps of: detecting a first wheel rotation rate and/or first wheel speed of the first motor-vehicle axle assigned to the electromechanical brake actuator; detecting a second wheel rotation rate and/or first wheel speed of the second motor-vehicle axle; and determining the state of the brake lining on the basis of the first and second wheel rotation rate and/or wheel speed. A method for operating a brake system of a motor vehicle, a computer program product, a control unit and a vehicle brake system are also disclosed.

15 Claims, 1 Drawing Sheet

(58) Field of Classification Search
CPC ........ B60T 8/3205; B60T 8/322; B60T 8/329; B60T 8/58; B60T 8/86; B60T 8/72; B60T 8/88; B60T 13/74; B60T 13/741; B60T 13/748; B60T 17/22; B60T 17/221; B60T 2201/10; B60T 2201/124; B60T 2250/04; B60T 2250/042; B60T 2270/406; F16D 66/00; F16D 66/021; F16D 2066/001; B60W 2520/10; B60W 2520/26; B60W 2520/263; B60W 2520/28; B60W 2510/184; B60W 2510/186; B60W 10/18; B60W 10/192

See application file for complete search history.

(56) References Cited

FOREIGN PATENT DOCUMENTS

| | | | | |
|---|---|---|---|---|
| DE | 102019004963 A1 | * | 1/2021 | |
| EP | 1407951 A1 | * | 4/2004 | ............. B60T 13/74 |
| JP | 2017109659 A | | 6/2017 | |
| KR | 20220001551 A | * | 1/2022 | |

* cited by examiner

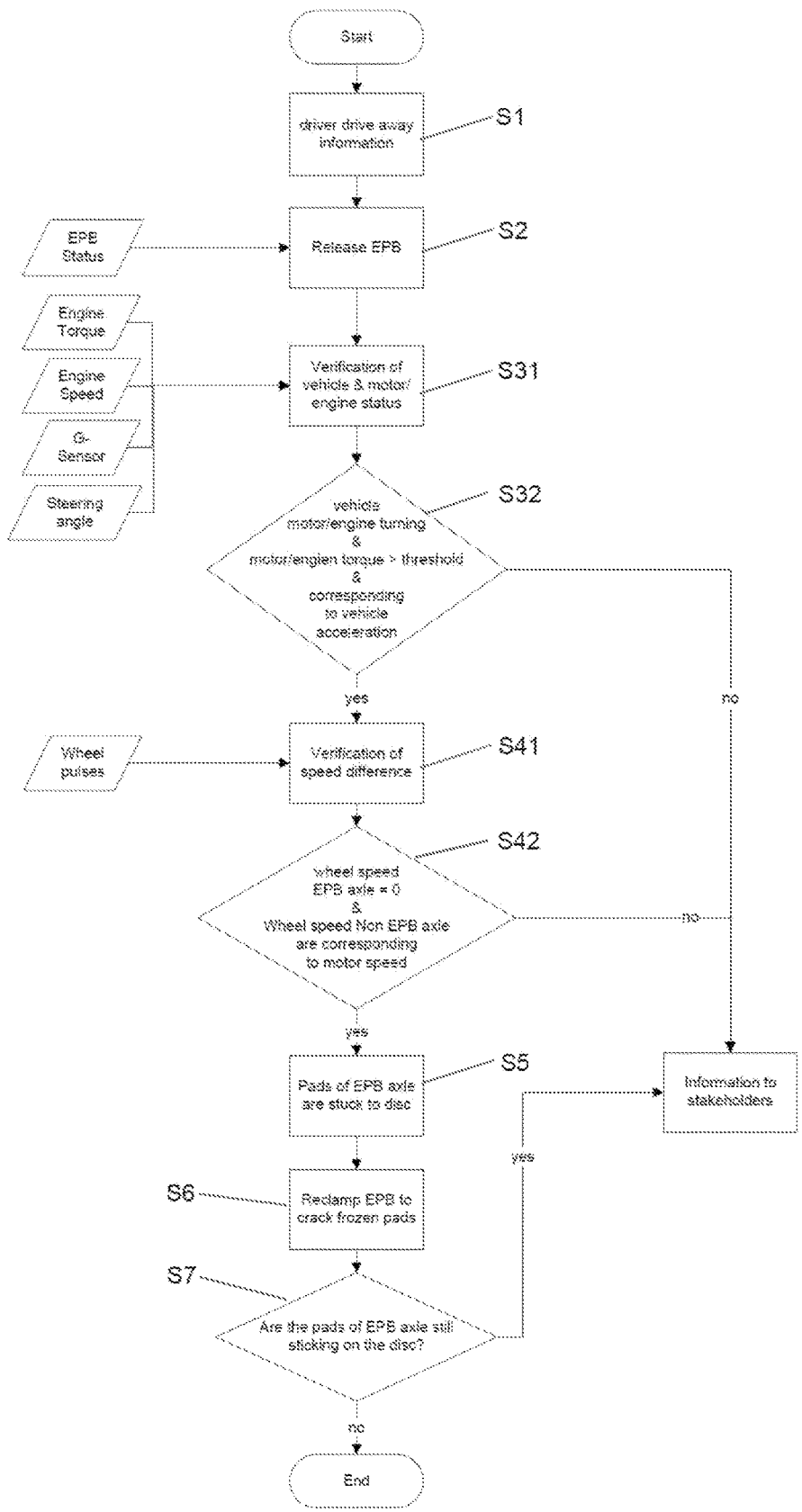

METHOD AND TECHNOLOGY FOR DETECTING AND RELEASING ICED-UP BRAKE LININGS OF AN ELECTRIC PARKING BRAKE

CROSS-REFERENCE TO RELATED APPLICATION

This application claims priority to German Priority Application No. 102021117276.4, filed Jul. 5, 2021, the disclosure of which is incorporated herein by reference in its entirety.

TECHNICAL FIELD

The disclosure relates to a method for determining a state of a brake lining on a wheel brake of a brake system of a motor vehicle, a method for operating a brake system of a motor vehicle, a computer program product, a control unit and a vehicle brake system for a vehicle.

BACKGROUND

Owing to an open design, liquids, snow, ice or other contaminants may settle on the components of friction brake devices in motor vehicles, such as a brake disc or a brake lining, and may lead to unwanted sticking of the brake lining to the brake disc after the release of the brake device or of the application of a braking force. In particular, ice deposits on braking surfaces can considerably restrict braking performance and vehicle steering capability. For example, in the case of rear-wheel drive vehicles with iced-up brake linings on the front vehicle axle with an electronic parking brake (EPB), the vehicle steering capability may be restricted, meaning that the vehicle cannot be maneuvered properly in snow or ice. This may also limit or hinder autonomous driving and/or exiting from parking spaces, e.g. in the case of valet parking in car parks.

JP 2017-109659 A2, for example, discloses an electric parking brake device having a temperature sensor for detecting the outside temperature of the vehicle and a freeze-preventing device for switching between a first partially unlocked state, in which the application of the braking force to some of the plurality of wheels is cancelled and the application of the braking force to the remaining other wheels is maintained, and a second partially unlocked state, in which the release of the braking force to some of the wheels is stopped, the braking force is applied and the application of the braking force to the remaining other wheels is cancelled, wherein the temperature sensor detects a temperature that is less than or equal to a prescribed temperature.

SUMMARY

What is needed is to functionally improve a method mentioned at the outset. In addition, what is needed is to structurally and/or functionally improve a computer program product mentioned at the outset, a control unit mentioned at the outset, and a vehicle brake system mentioned at the outset.

A method can be or be used to determine a state of a brake lining on a wheel brake of a brake system of a motor vehicle. The wheel brake can have an electromechanical brake actuator. The electromechanical brake actuator can be designed to build up a force, such as braking force, acting on a brake disc of the brake system by pressing the brake lining against the brake disc. The wheel brake and/or the electromechanical brake actuator can be assigned to a first axle, such as the wheel axle, front axle or rear axle, of the motor vehicle and/or can be effectively arranged there. The motor vehicle can be a passenger car or a truck. The wheel brake and/or the electromechanical brake actuator can be a parking brake device, e.g. an electric parking brake (EPB), or can be a part thereof. Instead of the designation "wheel", it is possible above and/or below to select the designation "tyre".

The method can comprise the step of: detecting a first wheel rotation rate and/or first wheel speed of the first motor-vehicle axle assigned to the electromechanical brake actuator. The first wheel rotation rate and/or first wheel speed can be the rotation rate or speed of a wheel on the first axle, e.g. the front axle or rear axle, of the motor vehicle. The wheel brake and/or the electromechanical brake actuator can be assigned to this first axle and/or the wheel brake and/or the electromechanical brake actuator can be effectively arranged on this axle. The first wheel rotation rate and/or first wheel speed can be detected by a first wheel rotation rate sensor and/or wheel speed sensor. The first wheel rotation rate and/or first wheel speed can be provided by a control unit of the motor vehicle.

The method can further comprise the step of: detecting a second wheel rotation rate and/or second wheel speed of the second motor-vehicle axle. The second wheel rotation rate and/or second wheel speed can be the rotation rate or speed of a wheel on the second axle, e.g. the front axle or rear axle, of the motor vehicle. The wheel brake and/or the electromechanical brake actuator may not be assigned to this second axle and/or the wheel brake and/or the electromechanical brake actuator may not be effectively arranged on this second axle. The second wheel rotation rate and/or second wheel speed can be detected by a second wheel rotation rate sensor and/or wheel speed sensor. The second wheel rotation rate and/or second wheel speed can be provided by the control unit of the motor vehicle.

For example, the first axle can be the front axle of the motor vehicle, to which the wheel brake and/or the electromechanical brake actuator are assigned and/or on which the wheel brake and/or the electromechanical brake actuator can be effectively arranged, and the second axle can be the rear axle of the motor vehicle, to which the wheel brake and/or the electromechanical brake actuator may not be assigned and/or on which the wheel brake and/or the electromechanical brake actuator may not be effectively arranged. Alternatively, the first axle can be the rear axle of the motor vehicle, to which the wheel brake and/or the electromechanical brake actuator are assigned and/or on which the wheel brake and/or the electromechanical brake actuator can be effectively arranged, and the second axle can be the front axle of the motor vehicle, to which the wheel brake and/or the electromechanical brake actuator may not be assigned and/or on which the wheel brake and/or the electromechanical brake actuator may not be effectively arranged. The first axle can be the axle to which the electronic parking brake is assigned and/or on which the electronic parking brake is effectively arranged. The first axle can be the parking brake axle/EPB axle. The second may be the axle to which the electronic parking brake is not assigned and/or on which the electronic parking brake is not effectively arranged. The second axle can be the non-parking brake axle/non-EPB axle.

The method can further comprise the step of: determining the state of the brake lining on the basis of the first and second wheel rotation rate and/or first and second wheel speed. The state can be an adhesion state, such as a sticking state, and/or an icing state of the brake lining. The state can be a state which indicates and/or defines whether or not the brake lining is adhering to or stuck to the brake disc, e.g. if the wheel brake and/or the electromechanical brake actuator is in the released and/or opened state. The adhesion or sticking of the brake lining to the brake disc can result from and/or be caused by snow, ice or icing. In the method, a state of the first and/or second axle can be determined. The state of an axle can define whether the axle is rotating or stationary, for example.

The state of the brake lining and/or the state of the first axle and/or the state of the second axle can furthermore be determined and/or verified on the basis of one or more current motor vehicle parameters. The one or more motor vehicle parameters can be selected from the group comprising: engine rotation rate, engine speed, engine torque, drive shaft rotation rate, drive shaft speed, drive shaft torque, acceleration value, steering angle value, wheel pulses, brake status of the wheel brake and/or of the electromechanical brake actuator. In the method, the engine rotation rate and/or the engine speed and/or the engine torque can be detected. The engine rotation rate and/or engine speed and/or engine torque can be provided by the control unit of the motor vehicle. In the method, the drive shaft rotation rate and/or the drive shaft speed and/or the drive shaft torque can be detected. The drive shaft rotation rate and/or the drive shaft speed and/or the drive shaft torque can be provided by the control unit of the motor vehicle. In the method, an acceleration value and/or a steering angle value can be detected. The acceleration value and/or a steering angle value can be provided by the control unit of the motor vehicle. The acceleration value can be the acceleration value of the motor vehicle. The acceleration value can be a value and/or signal of an acceleration sensor. The steering angle value can be an angle value of the steering wheel of the motor vehicle. The steering angle value can be a value and/or signal of a steering angle sensor. In the method, one or more wheel pulses of one and/or more wheels can be detected. The wheel pulses can be provided by the control unit. A wheel pulse can define a rolling distance, such as a rolling contact distance or rolling contact circumference, of the wheel or tyre. After a predetermined rolling distance, a wheel pulse can be generated. For example, a wheel pulse can be defined and/or generated after a rolling distance of approximately 4 cm. In the method, the state of the brake lining and/or the state of the first and/or second axles can be determined by one and/or more wheel pulse/s, for example 12 wheel pulses. The state of an axle can define whether the axle is rotating or stationary, for example.

The first and/or second wheel rotation rate and/or wheel speed can be detected when the wheel brake and/or the electromechanical brake actuator are/is not applying any braking force to the brake disc and/or the engine of the motor vehicle is in operation. The state of the brake lining and/or the state of the first and/or second axle can be determined when the wheel brake and/or the electromechanical brake actuator are/is not applying any braking force acting on the brake disc and/or the engine of the motor vehicle is in operation.

In the method, a brake status of the wheel brake and/or of the electromechanical brake actuator can be determined. The brake status can be a brake status of the electric parking brake, for example a parking brake status/EPB status. Brake status can be provided by the control unit. The brake status can define and/or indicate whether the brake or the actuator is or is not in a released or opened state and/or whether or not a force, such as braking force, is being applied to the brake disc.

A current motor vehicle status can be determined and/or verified on the basis of one or more motor vehicle parameters. For example, the current motor vehicle status can be determined and/or verified after determining the brake status. It can be determined whether the engine of the motor vehicle is in operation or is rotating. It can be determined whether the detected engine rotation rate and/or engine speed and/or engine torque is greater than a predetermined and/or predefined threshold value and/or corresponds to an acceleration of the motor vehicle.

In the method, it can be determined whether the first wheel rotation rate and/or first wheel speed of the first axle of the motor vehicle are/is less than the second wheel rotation rate and/or second wheel speed of the second axle of the motor vehicle. In the method, it can be determined whether the first wheel rotation rate and/or first wheel speed of the first axle of the motor vehicle have/has the value zero. In the method, it can be determined whether the second wheel rotation rate and/or second wheel speed of the second axle of the motor vehicle substantially correspond/corresponds to the engine rotation rate and/or engine speed and/or drive shaft rotation rate and/or drive shaft speed of the motor vehicle.

In the method, it can be determined that, in a released state of the wheel brake and/or of the electromechanical brake actuator, the brake lining is adhering to and/or stuck to the brake disc if the first wheel rotation rate and/or first wheel speed of the first axle of the motor vehicle have/has the value zero and/or are/is less than the second wheel rotation rate and/or second wheel speed of the second axle of the motor vehicle. In the method, it can be determined that, in the released state of the wheel brake and/or of the electromechanical brake actuator, the brake lining is adhering to and/or stuck to the brake disc if the first wheel rotation rate and/or first wheel speed of the first axle of the motor vehicle have/has the value zero and/or are/is less than the second wheel rotation rate and/or second wheel speed of the second axle of the motor vehicle, and the second wheel rotation rate and/or second wheel speed of the second axle of the motor vehicle substantially correspond/corresponds to the engine rotation rate and/or engine speed and/or drive shaft rotation rate and/or drive shaft speed of the motor vehicle.

In the method, it can be determined whether the brake lining is adhering to and/or stuck to the brake disc and/or the brake lining and the brake disc are held together by snow, ice or icing if the wheel brake and/or the electromechanical brake actuator are/is in the released or opened state and/or if no force, such as a braking force, is being applied to the brake disc.

In a method for operating a brake system of a motor vehicle, wherein the brake system comprises a wheel brake which has a brake lining and an electromechanical brake actuator which is designed to build up a force, such as a braking force, acting on a brake disc of the brake system by pressing the brake lining against the brake disc, and which is assigned to a first axle of the motor vehicle, a state of the brake lining can be determined in accordance with the method described above and/or below, in particular for determining a state of a brake lining on a wheel brake of a brake system of a motor vehicle.

In the method for operating the brake system, a control signal for the electromechanical brake actuator and/or the wheel brake can be generated on the basis of the determined state of the brake lining.

In the method, the control signal can cause the electromechanical brake actuator and/or the wheel brake to build up a force acting on the brake disc of the brake system by pressing the brake lining against the brake disc, e.g. when it has been determined that the brake lining is adhering to and/or stuck to the brake disc in the released and/or opened state of the wheel brake and/or of the electromechanical brake actuator.

In the method, it can be determined whether or not the brake lining continues to adhere to and/or be stuck to the brake disc in the released and/or opened state of the wheel brake and/or of the electromechanical brake actuator.

In the method, the wheel brake and/or the electromechanical brake actuator can be released or opened, for example by the control signal. In the method, the wheel brake and/or the electromechanical brake actuator can be closed, for example by the control signal.

In the method, a defined and/or predetermined brake pressure can be applied by means of the wheel brake and/or the electromechanical brake actuator. In the method, a brake pressure can be set in accordance with a predetermined brake pressure profile, for example, by components of the brake system. It is possible for brake pressures that vary with time to be specified.

By operation of the wheel brake and/or of the electromechanical brake actuator, adhesion and/or icing between the brake lining and the brake disc and/or sticking of the brake lining to the brake disc can be released, for example by a single or multiple activation or closure and/or release/opening of the wheel brake and/or of the electromechanical brake actuator.

The method for determining a state of a brake lining on a wheel brake of a brake system of a motor vehicle and/or the method for operating a brake system of a motor vehicle can be stored as a computer program at least in part on a computer, microcomputer, in an electronic control and/or processing unit, in a control system, on a storage medium or on a machine-readable carrier and/or can be implemented there. The computer program can be distributed in the form of software between one or more storage media, control and/or processing units, such as electronic control units (ECUs) or computers, etc., for example in the motor vehicle. The storage medium can be a semiconductor memory, a hard disk memory or an optical memory.

A computer program product can comprise program code in order, when the computer program product is executed on a processor, to carry out the method described above and/or below, in particular for determining a state of a brake lining on a wheel brake of a brake system of a motor vehicle and/or for operating a brake system of a motor vehicle. A computer program product can cause an apparatus, such as a controller, e.g. an electronic controller, and/or control and/or processing unit/device, a control system, a driver assistance system, a vehicle brake system, a processor or a computer, to carry out the method described above and/or below, in particular for determining a state of a brake lining on a wheel brake of a brake system of a motor vehicle and/or for operating a brake system of a motor vehicle. For this purpose, the computer program product can have corresponding data records and/or program code and/or the computer program.

A control unit can be used in a specific motor vehicle. The control unit can be set up and intended for use in a motor vehicle. The control unit can have an electronic controller. The control unit can be an electronic control unit (ECU). A plurality of control units can be provided. The plurality of control units can be connected via a bus system, for example a controller area network (CAN), and/or can exchange data with one another. The electronic controller and/or the control unit can have a microcomputer and/or processor. The control unit can comprise one or more sensors, which can detect one or more motor vehicle parameters and/or brake status. The control unit can comprise the computer program product described above and/or below. The control unit can be designed to carry out the method described above and/or below.

A vehicle brake system can be or be used for a vehicle, such as a motor vehicle. The vehicle brake system can comprise a wheel brake which has a brake lining and an electromechanical brake actuator which is designed to build up a force, such as a braking force, acting on a brake disc of the brake system by pressing the brake lining against the brake disc, and which is assigned to a first axle of the motor vehicle. The vehicle brake system can comprise a control unit which is designed to cause the vehicle brake system to carry out the method described above and/or below, in particular for determining a state of a brake lining on a wheel brake of a brake system of a motor vehicle and/or for operating a brake system of a motor vehicle.

The wheel brake and/or the electromechanical brake actuator can be a parking brake device, and in one exemplary arrangement, an electric parking brake, or can be a part thereof. The electric parking brake can be designed to continuously provide a braking force, particularly if the vehicle temporarily assumes a stationary state, for example a parking state or a hill start. The electric parking brake can be designed to hold and/or mechanically fix the electromechanical brake actuator and/or a wheel brake piston in a braking-force-generating position.

The vehicle brake system can comprise a wheel brake with a brake cylinder and a piston movable therein, which, to generate a braking force, can be moved under the action of a hydraulic pressure into an actuating position in which the piston presses the brake lining and/or friction lining against the rotationally mounted brake disc. The electric parking brake can comprise an actuating member which is designed to maintain a braking force acting on the brake disc by the actuating member pressing the brake lining and/or friction lining against the brake disc. The electric parking brake can have a corresponding brake pad. The electromechanical brake actuator of the electric parking brake can be designed to actuate the brake lining and/or friction lining or the brake pad in such a way that a clamping force is exerted against the brake disc and/or a locking state is brought about in this way. The brake disc can be connected to the first or second axle of the vehicle and/or to a vehicle wheel for conjoint rotation therewith. The brake pad can press against the brake disc via at least one brake lining fastened to it.

The electromechanical brake actuator of the electric parking brake can be designed to generate a clamping force for the brake lining or friction lining and/or to transmit it to the brake pad in order to establish a locking state. For example, the electromechanical brake actuator of the electric parking brake can comprise a drive device, such as an electric motor, and/or a transmission unit, in order to transmit the driving motion or driving force generated by the drive device to the brake lining or friction lining and/or the brake pad and in this way carry out an actuation of the parking brake.

The term "clamping force" can be understood to mean a force provided by the electromechanical brake actuator and/or exerted by the brake lining or friction lining and/or by the brake pad on a mating surface in order to brake a movement of the mating surface, e.g. transversely to the acting force, or to hold the mating surface stationary. The mating surface can be a braking surface of the brake disc. The clamping force can also include an actuating force which is to be applied until the brake lining or friction lining and/or the brake pad are/is pressed against the mating surface. The term "clamping force" can also be understood to mean the term "locking force" or "locking braking force".

The term "locking state" can be understood to mean a state in which the mating surface is held stationary owing to the clamping force. For example, in the locking state, a minimum damping force is reached or exceeded in order to reliably maintain locking. The minimum clamping force can, for example, be dimensioned to reliably hold the motor vehicle stationary, even if the motor vehicle is on a sloping carriageway for example.

In other words, a strategy for detecting and/or freeing iced-up EPB brake linings can be provided. The situation can be detected by analysis of the wheel rotation rates on EPB and non-EPB axles and/or verified with the engine or drive shaft rotation rate and/or acceleration sensor signal and/or steering angle signal. In order to reduce incorrect detection of stuck brake linings, the engine status of the vehicle can be checked and/or verified. Wheel pulses can be detected. For example, 12 wheel pulses can be detected in order to detect a stuck front axle and a rotating rear axle. A wheel pulse can signify and/or define a rolling distance of about 4 cm. A distance or rolling distance of 48 cm can be provided to detect stuck brake linings, for example. It is possible to detect wheel pulses, a steering angle, EPB status, engine torque, engine rotation rate and/or acceleration sensor signals. The EPB can be actuated one, two or more times, applying it fully and then releasing it again for example, to release stuck brake linings again.

With the exemplary arrangements of the disclosure, it is possible to prevent or release the brake lining from sticking, becoming stuck or adhering to the brake disc. In particular, ice deposits on the braking surfaces or icing between the brake lining and the brake disc can be released quickly and simply. Iced-up brake linings can be reliably detected. Detection errors can be minimized. The braking power and vehicle steering capability can be considerably improved and/or the safety can be increased.

BRIEF DESCRIPTION OF DRAWINGS

Exemplary arrangements of the disclosure are described in greater detail below with reference to figure, where, in schematic form and by way of example:

FIG. 1 shows a flow diagram of a method for determining a state of a brake lining on a wheel brake of a brake system of a motor vehicle and a method for operating a brake system of a motor vehicle.

DETAILED DESCRIPTION

FIG. 1 shows schematically a flow diagram of a method for determining a state of a brake lining on a wheel brake of a brake system of a motor vehicle, and a method for operating a brake system of a motor vehicle.

In a step S1, it is detected if a driver of a motor vehicle wants to drive away and is determining corresponding information.

The motor vehicle has a vehicle brake system with a controller and an electronic parking brake (EPB), which comprises a brake lining and an electromechanical brake actuator, wherein the electromechanical brake actuator is designed to build up a force, such as a braking force, which acts on a brake disc of the vehicle brake system, by pressing the brake lining against the brake disc, and is assigned to a first wheel axle of the motor vehicle.

In a step S2, a status of the electronic parking brake is determined, which indicates, in particular, whether the electronic parking brake has been released or is released.

In a step S31, a motor vehicle status and the engine status are checked or verified, wherein motor vehicle parameters, such as engine torque, engine speed, an acceleration value and a steering angle, are detected. In a step S32, it is then determined whether the engine is running or rotating and whether the engine torque is above a predetermined threshold value and corresponds to a vehicle acceleration. If this is the case, a step S41 follows.

In step S41, it is checked or verified whether there is a speed difference between an axle with the electronic parking brake (EPB axle) and an axle without an electronic parking brake (non-EPB axle) of the motor vehicle, wherein wheel pulses or wheel rotation rates and/or wheel speeds of the EPB axle and the non-EPB axle are detected and, in a step S42, it is determined whether the wheel rotation rate or wheel speed of the EPB axle is equal to zero and whether the wheel rotation rate or wheel speed of the non-EPB axle corresponds substantially to the engine speed. If this is the case, a step S5 follows.

In step S5, a state of the brake lining can then be determined, in particular whether the brake lining of the electronic parking brake is stuck to the brake disc despite the parking brake being released.

In a step S6, the electromechanical brake actuator of the electronic parking brake is then actuated in such a way by a control signal generated on the basis of the state of the brake lining that the electronic parking brake is engaged again in order to build up a force acting on the brake disc of the brake system by pressing the brake lining against the brake disc, thereby releasing the brake lining stuck to the brake disc, e.g. breaking up ice.

In a step S7, it can be checked whether the brake lining is still stuck to the brake disc or not.

The individual steps can optionally be repeated until the stuck brake lining has been released from the brake disc or until the ice has been broken.

In particular, "can" denotes optional features of the disclosure. Accordingly, there are also developments and/or exemplary arrangements of the disclosure which have the respective feature or features as additions or alternatives.

If necessary, it is also possible to select isolated features from the combinations of features disclosed here, breaking any structural and/or functional relationship that may exist between said features, and to use them in combination with different features to define the subject matter of a claim. The sequence and/or number of all steps of the method can be varied.

The invention claimed is:

1. A method for determining a state of a brake lining on a wheel brake of a brake system of a motor vehicle, wherein the wheel brake has an electromechanical brake actuator which is designed to build up a force acting on a brake disc of the brake system by pressing the brake lining against the brake disc, and which is assigned to a first axle of the motor vehicle, wherein the method comprises:

detecting, via a control unit, a first wheel rotation rate and/or first wheel speed of the first motor-vehicle axle assigned to the electromechanical brake actuator;

detecting, via the control unit, a second wheel rotation rate and/or second wheel speed of the second motor-vehicle axle; and determining, via the control unit, an adhesion state of the brake lining by determining whether the brake lining is adhering to and/or stuck to the brake disc due to icing while the electromechanical brake actuator is in a released state, wherein the determination comprises:
- verifying that the wheel brake and the electromechanical brake actuator are not applying any braking force to the brake disc;
- verifying that an engine of the motor vehicle is in operation;
- determining that the first wheel rotation rate and/or first wheel speed of the first motor-vehicle axle has the value zero while the second wheel rotation rate and/or second wheel speed of the second motor-vehicle axle is greater than zero;
- determining that the second wheel rotation rate and/or second wheel speed substantially corresponds to at least one of: an engine rotation rate,
- an engine speed, a drive shaft rotation rate, or a drive shaft speed of the motor vehicle; and
- in response to determining the brake lining is adhering to and/or stuck to the brake disc, generating, via the control unit, a control signal for the electromechanical brake actuator to build up a force acting on the brake disc by pressing the brake lining against the brake disc and then releasing the force, thereby freeing the stuck brake lining from the brake disc by breaking up ice between the brake lining and the brake disc.

2. The method according to claim 1, wherein the state of the brake lining is also determined and/or verified on the basis of one or more current motor vehicle parameters.

3. The method according to claim 2, wherein the one or more motor vehicle parameters is/are selected from the group comprising: engine rotation rate, engine speed, engine torque, drive shaft rotation rate, drive shaft speed, drive shaft torque, acceleration value, steering angle value, wheel pulses, brake status of the wheel brake and/or of the electromechanical brake actuator.

4. The method according to claim 1, wherein the first and second wheel rotation rate and/or wheel speed are detected, and the state of the brake lining is determined when the electromechanical brake actuator is not applying any braking force acting on the brake disc and/or the engine of the motor vehicle is in operation.

5. The method according to claim 1, wherein the wheel brake and/or its electromechanical brake actuator are/is a parking brake device, or is a part thereof.

6. The method according to claim 1, wherein a brake status of the wheel brake and/or of the electromechanical brake actuator is determined.

7. The method according to claim 1, wherein a current motor vehicle status is determined and/or verified on the basis of one or more motor vehicle parameters, after determining the brake status, wherein the one or more motor vehicle parameters is/are selected from the group comprising: engine rotation rate, engine speed, engine torque, drive shaft rotation rate, drive shaft speed, drive shaft torque, acceleration value, steering angle value.

8. The method according to claim 1, wherein it is determined whether the engine of the motor vehicle is in operation or rotating, and/or it is determined whether the detected engine rotation rate is greater than a predetermined threshold value and/or corresponds to an acceleration of the motor vehicle.

9. The method according to claim 1, wherein it is determined whether the first wheel rotation rate and/or first wheel speed of the first axle of the motor vehicle are/is less than the second wheel rotation rate and/or second wheel speed of the second axle of the motor vehicle, and/or whether the first wheel rotation rate and/or first wheel speed of the first axle of the motor vehicle have/has the value zero, and/or whether the second wheel rotation rate and/or second wheel speed of the second axle of the motor vehicle substantially correspond/corresponds to the engine rotation rate and/or engine speed of the motor vehicle.

10. A method for operating a brake system of a motor vehicle, wherein the brake system comprises a wheel brake which has a brake lining and an electromechanical brake actuator which is designed to build up a braking force acting on a brake disc of the brake system by pressing the brake lining against the brake disc, and which is assigned to a first axle of the motor vehicle, in which
- a state of the brake lining is determined and modified in accordance with the method according to claim 1.

11. The method according to claim 10, wherein it is determined whether or not the brake lining continues to adhere to and/or be stuck to the brake disc in the released state of the wheel brake and/or of the electromechanical brake actuator.

12. A computer program product comprising a program code for carrying out a method having the steps according to claim 1 when the computer program product is executed on a processor.

13. A control unit comprising a processor and the computer program product according to claim 12.

14. A vehicle brake system for a vehicle, wherein the vehicle brake system comprises:
- a wheel brake which has a brake lining and an electromechanical brake actuator which is designed to build up a braking force, acting on a brake disc of the brake system by pressing the brake lining against the brake disc, and which is assigned to a first axle of the motor vehicle; and
- a control unit, which is configured to cause the vehicle brake system to carry out a method having the steps according to claim 1.

15. The vehicle brake system according to claim 14, wherein the wheel brake and/or its electromechanical brake actuator are/is a parking brake device, or is a part thereof.

* * * * *